(12) United States Patent
Huang et al.

(10) Patent No.: US 7,454,222 B2
(45) Date of Patent: Nov. 18, 2008

(54) APPARATUS AND METHOD FOR CONTROLLING WIRELESS COMMUNICATION SIGNALS

(75) Inventors: Jun Huang, Ottawa (CA); Tom Duxbury, Dunrobin (CA)

(73) Assignee: Dragonwave, Inc., Kanata, ON (CA)

( * ) Notice: Subject to any disclaimer, the term of this patent is extended or adjusted under 35 U.S.C. 154(b) by 1366 days.

(21) Appl. No.: 09/990,349

(22) Filed: Nov. 23, 2001

(65) Prior Publication Data

US 2002/0061073 A1 May 23, 2002

Related U.S. Application Data

(60) Provisional application No. 60/252,463, filed on Nov. 22, 2000.

(51) Int. Cl.
*H04Q 7/20* (2006.01)

(52) U.S. Cl. .................. 455/522; 455/67.11; 455/226.1

(58) Field of Classification Search .............. 455/422.1, 455/435.5, 445, 453
See application file for complete search history.

(56) References Cited

U.S. PATENT DOCUMENTS

| | | | |
|---|---|---|---|
| 5,504,938 A | * | 4/1996 | Redden ...................... 455/436 |
| 5,914,950 A | * | 6/1999 | Tiedemann et al. ......... 370/348 |

* cited by examiner

*Primary Examiner*—Temica M Beamer

(57) ABSTRACT

An apparatus and method for controlling wireless communication signals is provided, in which a wireless transmitter in a communication network generates a signal carrying data for wireless transmission, and is capable of varying the data carrying capacity of the wireless transmission channel in response to the quantity of data received for wireless transmission. A monitor is provided to monitor the quantity of received data and the capacity of the communication channel is increased if the monitored quantity exceeds a predetermined threshold. The capacity of the communication channel can be varied by varying the level of modulation and/or by varying the level of code inserted into the data stream. The output power of the wireless transmission signal may be varied in response to the quantity of received data.

24 Claims, 9 Drawing Sheets

APPARATUS AND METHOD FOR CONTROLLING WIRELESS COMMUNICATION SIGNALS

CROSS-REFERENCE TO RELATED APPLICATION

This application claims priority from U.S. Provisional Patent Application Ser. No. 60/252,463 filed on 22 Nov. 2000.

BACKGROUND OF THE INVENTION

With the current "wave" of the commercialization of Internet usage, and the increasing usage of multimedia applications, the traffic demand is seen as a phenomenon which is exploding today. The response from the wired world is the emergence of Dense Wavelength Division Multiplexing (DWDM) technology, which can increase link throughput by one magnitude or more. That response leaves the last mile especially the wireless link as a potential bottleneck. As a consequence, the task of searching for a method for increasing the wireless link and its related network capacity is urgent.

This is why the spectrum efficiency becomes the first consideration for the spectrum license auction in most countries around the world. Whoever has the solution offering higher efficient use of the spectrum will win the bid. The traditional way of increasing the traffic throughput can be categorized into two main fundamental classes, one is deterministic, and the other is statistical.

For the deterministic class, there is a frequency reuse plan or cellular concept, which works in both the frequency domain and space domain. High frequency reuse can be achieved by reducing cell size, however, that means increasing the number of expensive Base Transceiver Stations (STS). This notion of "Pico cell" (approximately 100 meters in radius) has failed completely in cellular system deployment due to its high cost. Such an impractical system would include CT2+ (Cordless telephone Phase 2).

Another method is using high order modulation such as Quadrature Amplitude Modulation (QAM) and high efficiency coding schemes such as Turbo code [IEEE802.16.1 Standard]. These methods can both be considered as time domain methods.

The penalty of using n-QAM (n=4, 16, 32, 64, 128 . . . ) is that a higher Signal to Noise Ratio (SNR) is required. In other words, a transmitter with higher transmitting power and a receiver with a lower noise figure are needed. This makes the design of the system throughout the transmitter to receiver more complicated. For example, designing a linear Power Amplifier (PA) for 64 QAM for the Customer Premise Equipment (CPE) is already very challenging, bearing in mind that the PA is the most expensive component in a transmitter design.

The other limiting factor that prevents very high order QAM from being applied in wireless systems is that the cost of driving down the phase noise in the Phase Locked Loop (PLL) is still high. Higher QAM needs lower noise PLL.

As a consequence, some other researchers are using the concatenated Forward Error Coding (FEC) schemes such as Turbo code to approach the channel capacity limit, i.e. Shannon capacity limit. With a complicated soft iterative decoding algorithm, the limit can be approached to within less than 0.1 dB ranges. By applying different puncturing patterns, the different coding rate k/n can be achieved in practice, where k is the number of user information, and n is the total number of bits coded. Apparently this approach has reached its limit.

There is not much that can be done in the time domain processing, and most researchers have moved on to the space domain, studying the possibility of using time-space coding to take the advantage of the antenna diversities—space resource. This approach is promising, however, the cost is dependent on the increased number of antennas and the additional computation intensive processing [IEEE WCNC paper L2.1 by David Tse et al] in order to make use of multi-paths that exist in a certain environment for a certain frequency range.

This method is arranged on the evolution path of the Othogononal Frequency Division Multiple Access (OFDM). But the price of radio and antenna will prevent such a scheme from being deployed.

Therefore, as is apparent from above discussions, there are challenging problems in advancing deterministic methods.

For the statistical method, one type is the Bandwidth on Demand (BoD) strategy based on the Time Division Multiple Access (TDMA) method. Apparently, this scheme, which works in the time domain, has also reached its maximum capacity. Many-advanced methods have been already proposed [ETSI DV-RCS latest revision for Media Access Control (MAC) section]. Most of above methods work at lower layer with a deterministic approach.

An example of a system which involves lower layer hardware assisting higher layer real time software processing, and vice versa is an optical device, which is able to directly process transport layer Internet Protocol (IP) headers without intervention of electrical signals at all.

Although the service provider is not able to charge the end customer more for best effort traffic, however, the quality of service experienced largely depends on a "bad" experience when the end-customer suffers excessively long congestion periods. As a consequence, to minimize congestion experiences people have had with cable modems is important for a new service to gain a "good" reputation over the time.

The practical methods for coping with congestion can be placed in two in 2 different categories. One is the host centric, window and feedback based method used in Internet Protocol (IP), and the other is the switch centric, rate and reservation-based method employed in Asynchronous Transfer Mode (ATM).

Most (if not all) congestion control methods used in the past like Transmission Control Protocol (TCP) for IP or Available Bit Rate (ABR) for ATM are to throttle the traffic source.

Broadband Wireless Access (BWA) services are commonly being deployed with Multi-channel Multi-point Distribution System (MMDS) or Local Multi-point Distribution System (LMDS) methods [IEEE Computer July 2000 by Sixto Ortiz Jr.]. For the case of using the LMDS method, the microwave frequency employed is around Ka band, i.e. 11 GHZ to 60 GHz. At this frequency range, rain causes severe attenuation of the signal.

For example, for the rain region K, to achieve a reasonably high availability of 99.99% around the year for the horizontal polarized frequency of 43.5 GHz the radio will need a 28 dB link margin [ETSI BRAN#20 contribution BRAN20d028 by Paolo Agabio]. This issue is one of the key problems encountered in the design of such a communication system.

In practice, the rain margin for some radios [e.g. Dragon-Link or DragonFire from DragonWave] can be set as high as 25 dB—and it is only used once in a while (53 minutes downtime per year to meet 99.99% availability). The automatic Power Control (APC) is usually controlled by a rain event, i.e. when there is rain on the radio signal path between the CPE and the base station, the power at the transmitter is increased to compensate the rain attenuation.

SUMMARY OF THE INVENTION

According to one aspect of the present invention, there is provided an apparatus for generating a signal for wireless transmission comprising signal generating means for receiving data and generating a signal containing received data for wireless transmission, and control means for controlling the data carrying capacity of said signal.

In one embodiment, the capacity of the communication channel may be increased in response to the level of received data for wireless transmission. The power level of the communication may also be increased to facilitate transmission at the higher capacity. Advantageously, this enables congestion or potential congestion at the transmitter to be alleviated and handed over to the receiver side of the network. If the receiver side of the network comprises a base station, for example connected to a public switched network, for example, by a high speed transmission system such as may be provided by an optical fiber based system, the receiver end should be able to handle the additional traffic. This technique may advantageously take advantage of the additional power available at the power amplifier which is required to compensate for rain fade or other attenuation to maintain the communication link in adverse conditions.

According to another embodiment, the capacity of the communication channel may be reduced in order to render the channel more resilient to interference or attenuation caused by adverse conditions, thereby increasing the availability of the communication link over existing systems.

According to another embodiment of the present invention, the transmitter may be adapted to reduce its power level in response to a low level of incoming data in order to reduce the communication channel's potential to interfere with another communication channel, thereby allowing the other communication channel to increase its capacity throughput to alleviate its own congestion. In one embodiment, the transmitter may transmit an indication of its ability to lower the power level of its transmission signal to a controller which can then inform other transmitters of this condition so that one or more transmitters may increase the capacity of their transmission channels.

According to another aspect of the present invention, there is provided an apparatus for generating a signal for wireless transmission comprising signal generating means for receiving data and generating a signal containing received data for wireless transmission, monitoring means for monitoring the quantity of data supplied to said signal generating means for wireless transmission, and control means for controlling the power of the generated wireless signal in response to said monitored quantity of data for wireless transmission.

According to another aspect of the present invention, there is provided a transmitter for generating and transmitting a wireless communication signal, the transmitter including signal control means for varying the power of the communication signal and limiting means for limiting the control means to control the power to reduce or substantially prevent interference by said wireless communication signal of a second wireless communication signal from another transmitter.

According to another aspect of the present invention, there is provided a transmitter for generating a communication signal for wireless transmission, comprising monitoring means for monitoring a quality of said wireless communication signal and capacity control means for controlling the data carrying capacity of said wireless communication signal in response to said monitored quality.

According to another aspect of the present invention, there is provided a controller for controlling the operation of a wireless transmitter in a wireless communication network containing a plurality of wireless transmitters, comprising monitoring means for monitoring interference of a communication channel associated with a wireless transceiver by a wireless signal from another wireless transmitter, signal generating means for generating a signal indicative of interference, and transmitting means for transmitting said interference indicating signal to the transmitter transmitting the wireless signal causing the interferences, to control the level of interference.

According to another aspect of the present invention, there is provided a controller for controlling the operation of a wireless transmitter in a wireless communication network containing a plurality of wireless transmitters, comprising monitoring means for monitoring a signal indicative of a power level of a wireless communication signal transmitted by a transmitter, comparing means for comparing the power level with a predetermined value, and transmitting means for transmitting a signal to said transmitter in response to said comparison indicative of the result of said comparison.

According to another aspect of the present invention, there is provided a controller for controlling the operation of a wireless transmitter in a wireless communication network having a plurality of wireless transmitters, comprising receiving means for receiving a signal indicative of a power level for a wireless communication signal from a transmitter in said network, and transmitting means for transmitting a signal in response to the received signal to another transmitter in said network for enabling said transmitter to increase the power level of its wireless transmission signal.

According to another aspect of the present invention, there is provided a method of generating a signal carrying data for wireless transmission, comprising receiving data for wireless transmission, monitoring a parameter indicative of the quantity of received data and varying the rate at which data is included in said signal in response to said monitored parameter.

According to another aspect of the present invention, there is provided a method of generating a signal for carrying data for wireless transmission, comprising monitoring a parameter indicative of a quality of said wireless signal, comparing said quality with predetermined value and decreasing the capacity of the wireless signal if said parameter falls below a predetermined value.

According to another aspect of the present invention, there is further provided a method of controlling a transmitter in a wireless communication network containing a plurality of transmitters, comprising monitoring interference of a wireless communication channel associated with a transmitter in said network by a second wireless communication channel associated with another transmitter in said network and in response to determining interference, transmitting a signal to the transmitter causing said interference to reduce the power level of its wireless transmission channel.

According to another aspect of the present invention, there is provided a method of determining an acceptable level of transmission power for each of a plurality of transmitters in a wireless communication network comprising the steps of increasing the transmission power of each transmitter in turn, monitoring interference of a communication channel associated with at least one of the other transmitters and determining an acceptable level of transmission power for each transmitter based on the power level of each transmitter at which an interference condition is detected.

According to another aspect of the present invention, there is provided an apparatus for generating a signal for wireless transmission, comprising signal generating means for receiving data and generating an output signal containing received data for wireless transmission, monitoring means for monitoring the quantity of data supplied to said generating means for wireless transmission and a controller for controlling said signal generating means to vary the rate at which data is output from said signal generating means in said output signal in response to said monitored quantity of data for wireless transmission.

According to another aspect of the present invention, there is provided a communication system comprising a first wireless transmitter and a second wireless transmitter, the first transmitter having means to vary the power level of the wireless transmission signal transmitted by said first transmitter, said second transmitter comprising signal generating means for generating a signal for wireless transmission containing data and means to vary the rate at which data is placed onto said signal, communication means for communicating from said first transmitter to said second transmitter a signal indicative of the wireless signal power level from said first transmitter, said second transmitter including means for increasing the data transmission rate output by said second transmitter when the power level of said first transmitter communicated by said communicating means is at a predetermined value.

According to another aspect of the present invention, there is provided a communication system comprising a first wireless transmitter and a second wireless transmitter, each transmitter having means to vary the output power level of its respective wireless transmission signal and means for communicating a signal from at least one of said first and second transmitter to the other transmitter indicative of the power level of said one transmitter, the other transmitter including means for varying its output power level in response to said signal communicated by said communication means.

According to another aspect of the present invention, there is provided a communication system comprising a transmitter for generating and transmitting a wireless data transmission signal, a receiver for receiving said wireless data transmission signal from said transmitter, means responsive to the attenuation of said wireless signal, and/or the presence of a potentially attenuating medium in the path of said signal for causing the output level of said wireless transmission signal to be increased when the attenuation reaches a predetermined level and/or the presence of said potentially attenuating medium is detected, detection means for detecting interference of another signal by said wireless transmission signal and control means for reducing the power level of said transmission signal output by said transmitter in response to the detection of said interference above an acceptable level.

According to one aspect of the present invention, there is provided an apparatus for generating a signal for wireless transmission, comprising signal generating means for receiving data and generating an output signal containing received data for wireless transmission, monitoring means for monitoring the quantity of data supplied to said generating means for wireless transmission and a controller for controlling said signal generating means to vary the rate at which data is output from said signal generating means in said output signal in response to said monitored quantity of data for wireless transmission.

Advantageously, this arrangement allows for example the expensive resource of the variable power amplifier dedicated to compensating for the rain margin to increase the system's best effort throughput and in particular to predict and assist in reducing or preventing congestion or providing congestion control For example, in one embodiment, the apparatus includes an automatic power control (APC) which is controlled by the congestion status of the link. The event of a heavy congestion is similar to a heavy rain; it also happens probably once a year (on mother's day or in other special periods), the chance of having both rain and congestion at the same time is very small. For example, it probability for rain is 0.001, and probability for congestion is 0.01, the joint event will have the probability of 0.0001.

According to another aspect of the present invention, there is provided an apparatus for generating a signal for wireless transmission comprising signal generating means for receiving data and generating a signal containing received data for wireless transmission, and a controller for controlling the data carrying capacity of said signal, based on one or more of (1) a condition of the wireless signal received by a wireless receiver and (2) an indication of a condition in the path of the wireless signal which affects transmission of the wireless signal.

According to another aspect of the present invention, there is provided a fixed-position wireless transmitter for generating a signal for wireless transmission comprising signal generating means for receiving data and generating a signal containing received data for wireless transmission at a frequency at or above 2 GHz which causes said wireless signal to be attenuated by atmospheric precipitation, monitoring means for monitoring the quantity of data supplied to said signal generating means for wireless transmission, and control means for controlling the power of the generated wireless signal within a range reserved to compensate for attenuation by atmospheric precipitation in response to said monitored quantity of data for wireless transmission.

According to another aspect of the present invention, there is provided a method of generating a signal for wireless transmission, comprising receiving data to be transmitted, monitoring a parameter indicative of the quantity of data to be transmitted, generating an output signal containing received data for wireless transmission and varying the rate at which data is output on said signal in response co said parameter.

According to yet another aspect of the present invention, there is provided a method of controlling the output power of a wireless transmission signal from each of a plurality of transmitters comprising monitoring interference of a said signal by another said signal, and controlling the output power of the transmitter causing said interference to reduce said interference in response to said monitored interference.

Further features of embodiments of the present invention are defined by the dependent claims.

BRIEF DESCRIPTION OF THE DRAWINGS

Examples of embodiments of the present invention will now be described with reference to the drawings, in which.

DESCRIPTION OF PREFERRED EMBODIMENTS

Figure 1:
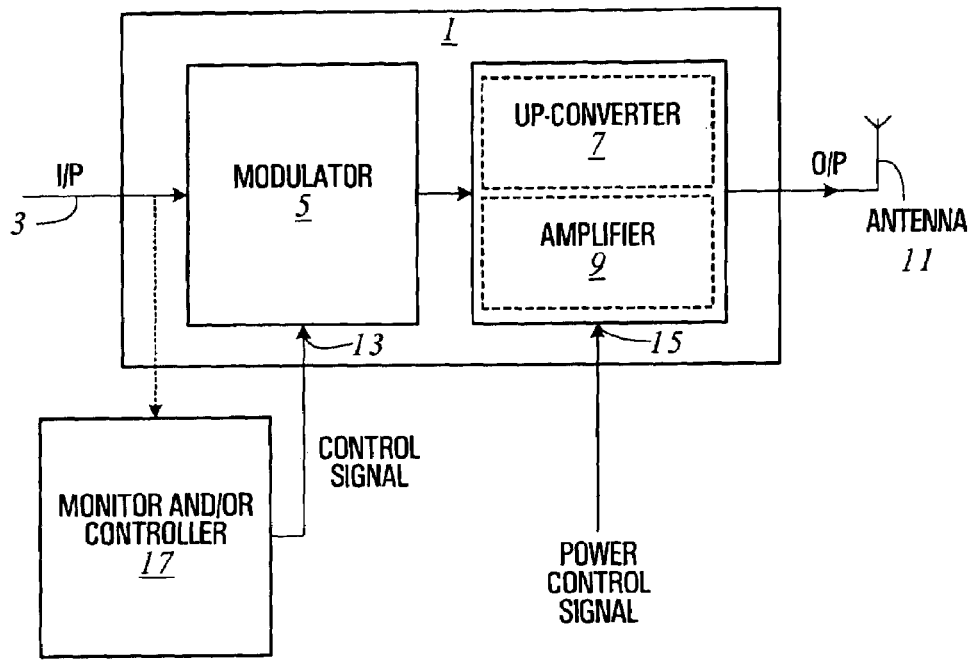
FIG. 1 shows a schematic diagram of a wireless transmitter according to an embodiment of the present invention.

FIG. 1 shows a wireless transmitter according to an embodiment of the present invention. The transmitter 1 has an input 3 for receiving data for transmission over a wireless communication link, a modulator 5 for generating a signal representative of the data, an up-converter 7 for up-converting the signal from the modulator to the desired frequency for RF transmission, and an amplifier 9 for amplifying the up-converted signal prior to transmission from an antenna 11. In this embodiment, the modulator 5 is capable of varying the data or bit carrying capacity of the wireless communication channel by varying the number of bits represented by each symbol or change of state in the output signal of the modulator. For example, a particular sequence of a given number of binary bits may be represented by a particular phase and/or amplitude of a signal, and the number of bits that can be represented by each or both of these parameters depends on the particular modulation scheme used. The modulator 5 is capable of changing the number of data bits per baud between at least two different levels. The modulation schemes which may be used by the modulator include, but are not limited to, any form of amplitude shift keying (ASK) or phase shift keying (PSK) or a mixture of both, for example Quaternary Phase Shift Keying (QPSK) which provides two bits per symbol, 8-PSK which provides 3 bits per symbol, and Quadrature Amplitude Modulation (QAM), for example 16-QAM, which provides 4 bits per symbol, 32-QAM, which provides 5 bits per symbol, 64-QAM which provides 6 bits per symbol, 256-QAM which carries 8 bits per symbol and any other level of QAM, including 1024-QAM. The modulator includes an input 13 for receiving a control signal for controlling the modulation rate, i.e. the modulation scheme to be used.

As the number bits per baud increases, a higher signal to noise ratio is required in order to resolve the symbol or constellation point, which may be defined by a particular phase and/or amplitude. Generally, each additional bit per baud doubles the required number of constellation points and this may require an increase of between 4 and 6 dB in the signal to noise ratio of the received signal for the same bit error rate (BER). In this embodiment, the power of the transmitter output signal may be varied to provide the required signal to noise ratio, for example by varying the gain of the amplifier 9. Transmitters for communication systems are usually provided with a power amplifier in which the gain can be increased in order to allow communication to continue in the event of rain or some other cause which reduces the signal strength at the receiver. For example, the amplifier gain may be increased by between 10 and 30 dB. Embodiments of the present invention may make use of the additional gain of the power amplifier, which is already required to provide a rain margin, for other purposes described below. In the embodiment shown in FIG. 1, the amplifier stage has an input 15 for receiving a control signal for controlling the gain of the amplifier.

Figure 2:
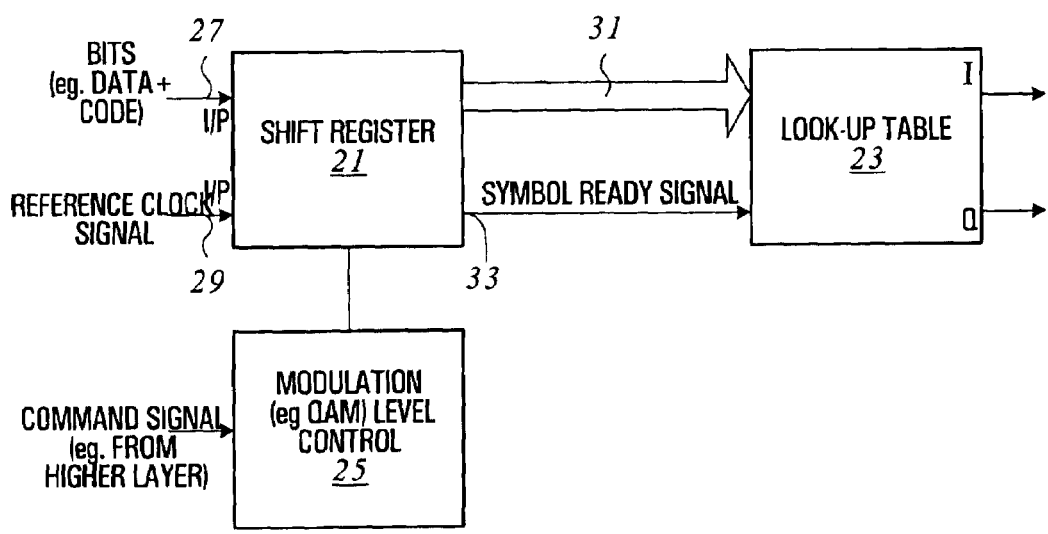
FIG. 2 shows a schematic diagram of a modulator according to an embodiment of the present invention.

FIG. 2 shows an embodiment of the modulator 5 in more detail. The modulator includes a shift register 21, a look-up table 23 and a modulation level controller 25. The shift register 21 has a first input 27 for receiving data bits and a second input 29 for receiving a reference clock signal. The shift register 21 further includes a first output 31 for outputting a group or sequence of a predetermined number of bits which is to be represented by a symbol or baud for wireless transmission and a second output 33 for outputting a symbol ready signal. In operation, the modulation level controller 25 which may be responsive to a higher layer command, controls the shift register to output groups of bits, each having a number of bits corresponding to the modulation level selected by the modulation level controller 25. For example, for QPSK the shift register is controlled to output 2 bits per group and for 16-QAM the shift register is adapted to output 4 bits of data per group. Each group is passed to the look-up table 23 which contains amplitude and phase information corresponding to the possible sequences of bits for each modulation level and which outputs a signal having an amplitude and phase which uniquely defines the particular group of bits.

Figure 3:
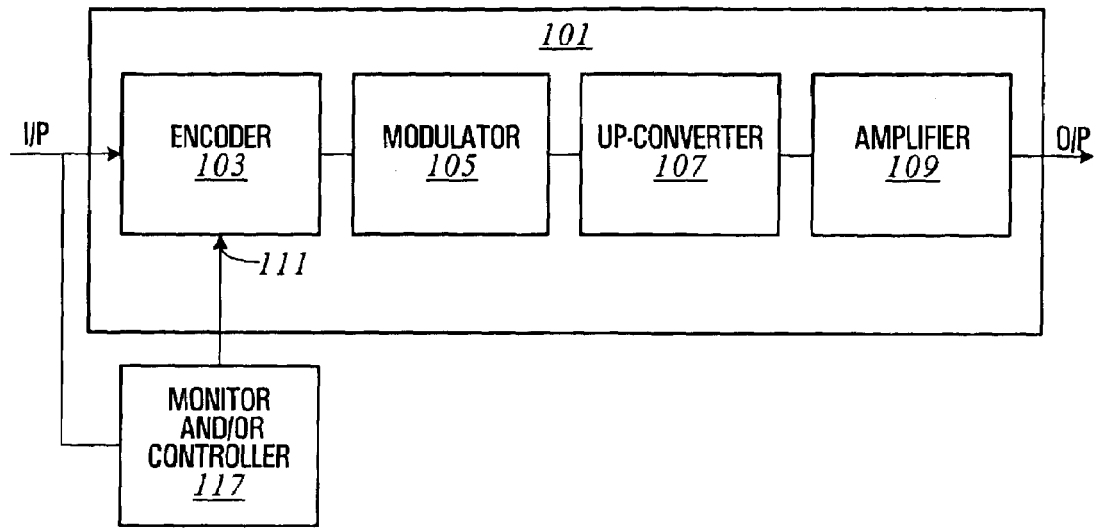
FIG. 3 shows a schematic of a wireless transmitter according to another embodiment of the present invention.

FIG. 3 shows a transmitter according to another embodiment of the present invention. The transmitter 101 includes an encoder 103, a modulator 105, an up-converter 107 and an amplifier 109. The encoder has an input 111 for receiving data to be transmitted over a wireless communication link and is adapted to insert code (i.e. additional bits) into the data to provide a means of verifying and correcting any corrupted data at the receiver, and may for example comprise forward error correction (FEC) code. In this embodiment, the encoder 103 is capable of varying the quantity of code i.e. the number of code bits which are inserted into the data stream. For a given modulation scheme, in which the number of bits per symbol or baud is predetermined, the number of actual data bits per symbol or baud may be varied by varying the amount of code inserted into the data stream. In this way, although the bits per baud and therefore the actual bit rate may be fixed, the capacity of the channel or wireless transmission signal for carrying actual data, as opposed to data plus code, may be varied by varying the proportion of bits which are dedicated to code. Thus, this embodiment provides another means of increasing or decreasing the data flow rate which may be implemented as an alternative or in addition to the embodiment shown in FIG. 1.

In this embodiment, the output power of the wireless transmission signal may be varied by varying the gain of the amplifier 109. For example, it may be desirable to increase the output power of the amplifier to provide a higher signal to noise ratio at the receiver when increasing the data flow rate by reducing the amount of code inserted into the data stream and therefore the ability of the receiver to correct bit errors based on the inserted code.

The modulator 105 of the embodiment shown in FIG. 3 may either have a fixed predetermined modulation rate, or the modulation rate may be variable, for example as for the embodiment shown in FIGS. 1 and 2, to provide a second means of varying the capacity or data flow rate of the transmission channel.

Examples of methods of data transmission according to various embodiments of the present invention will now be described.

Congestion Control

Embodiments of the transmitter may be adapted to vary the capacity of the data transmission channel in response to the amount of incoming data to be transmitted over the wireless communication link. For example, a monitor 17, shown in FIG. 1, or 117, shown in FIG. 3, may be provided to monitor a parameter indicative of the quantity of the incoming data, and if the parameter reaches or exceeds a predetermined threshold, the monitor causes the transmitter to increase the channel capacity by, for example, causing the modulation controller to increase the modulation level, and/or causing the encoder to reduce the quantity of error correction code inserted into the data, or a combination of both. In one embodiment, the transmitter includes a buffer for temporarily storing incoming data and the monitor is adapted to monitor the result of a comparison between a present buffer level and a threshold buffer level, and to generate a signal for causing the. transmitter to increase to channel capacity if the buffer level exceeds the threshold value. The output power of the wireless signal may also be increased, for example by increasing the gain of the power amplifier in response to the monitored buffer level to a value required for proper reception and resolution of the transmitted data at the receiver. For example, as the modulation level is increased or decreased by one bit/baud, the amplifier power level may be increased or decreased by a suitable increment, e.g. in a step of 4 to 6 dB.

According to this method, the transmitter is capable of increasing the channel capacity on demand or when required to handle surges in data traffic and to take pre-emptive action to increase the channel capacity before the input buffer becomes full and data is lost. Advantageously, the provision of adaptive channel capacity may also allow the size of the input buffer to be decreased, thereby reducing the cost of the transmitter.

Similarly, once the volume of incoming data traffic again decreases after the traffic surge, the transmitter may be controlled to again reduce the channel capacity for example to its normal or basic level. The power of the transmission signal-may also be reduced.

Transmission Reliability Control

In another transmission method according to another embodiment of the present invention, the transmitter may be controlled to reduce the channel capacity or data transmission rate in order to increase the reliability of reception of the transmitted data. The reliability of a communication link may be expressed as the percentage of time in which the channel is available per year. For example, an availability of 99.99 percent corresponds to a communication link downtime, i.e. when the link is not available, of about 52 minutes per year. While this figure may be acceptable to some customers, other customers may require a higher level of availability. An availability of 99.99% may be achieved by providing the transmitter with the capability to boost the power of the power amplifier in order to allow transmission to continue in the event of adverse weather conditions or other phenomena. However, while the increased power may be sufficient to allow the communication link to operate during some adverse weather conditions and yield an availability of 99.99%, the maximum operable power level of the amplifier may be insufficient to sustain the communication link for more extreme conditions such as tropical rain or other extreme phenomena, thereby precluding the possibility of achieving higher levels of availability, for example 99.995% or 99.999%. One solution would be to increase the maximum power level of the power amplifier, but this would significantly increase the cost of the transmitter.

In one mode of operation, according to an embodiment of the present invention, the capacity or data rate of the communication channel is reduced, for example, by reducing the modulation level (i.e. the number of bits per baud) or by increasing the level of error code inserted into the data, or a combination of both. By decreasing the level of modulation, the transmitted symbols or changes in state received at the receiver are more easily resolved, since for example amplitude and phase values are spread further apart, thereby effectively increasing the signal to noise ratio. Similarly, by increasing the proportion of error correction code inserted into the data, the ability of the receiver to correct errors increases, again effectively increasing the signal to noise ratio of the received signal and enhancing the resiliency of the wireless transmission channel to adverse conditions. In both cases, although the data rate is necessarily reduced, the ability to accurately receive transmitted data is improved. The power of the output signal may be increased with a decrease in the channel capacity or data rate to improve the availability of the wireless communication link further. Thus, the ability of the transmitter to reduce the capacity or data rate of the communication channel provides an alternative method of increasing the availability of the communication channel or an additional means of improving the availability of the communication link in combination with increasing the signal strength. Advantageously, adapting the capacity or data rate of the channel may further increase the availability of the communication channel over that which is possible by increasing the power of the transmission signal alone. Therefore, this method of operation makes it possible to maintain the communication link under more extreme conditions than has been possible in the past and makes it possible to increase the availability of the link. The link capacity or data rate may be reduced in response to any suitable signal, for example a signal based on or indicative of the bit error rate of the signal received by the receiver, or any other signal.

Idle Mode

In another method according to an embodiment of the present invention, the transmitter may be controlled to reduce the capacity of data rate of the channel in response to a low rate of incoming data traffic. For example, the capacity or data rate may be reduced to below the basic rate to which the subscriber is normally entitled. The output power of the wireless signal may also be reduced, for example by reducing the gain of the power amplifier. Again, the gain of the power amplifier may be reduced to below the basic transmission power. This method may be implemented by monitoring the level of a buffer for temporarily scoring incoming data prior to wireless transmission. In this case, the transmission channel is appropriately conditioned based on the data throughput requirements and, advantageously, the conditioning of the transmission channel may effectively be driven by the level of incoming data. Advantageously, this mode of operation can be used to reduce the level of interference of another transmission channel by the present channel, so that the power and capacity of the other channel can be increased to handle a surge in data flow. The reduction of the capacity and/or power of the transmission channel may be initiated by the transmitter itself which may also transmit a signal indicating its operating status for use in a communication network, or by a request from another transmitter to make the reduction.

Wireless Receiver

Figure 4:
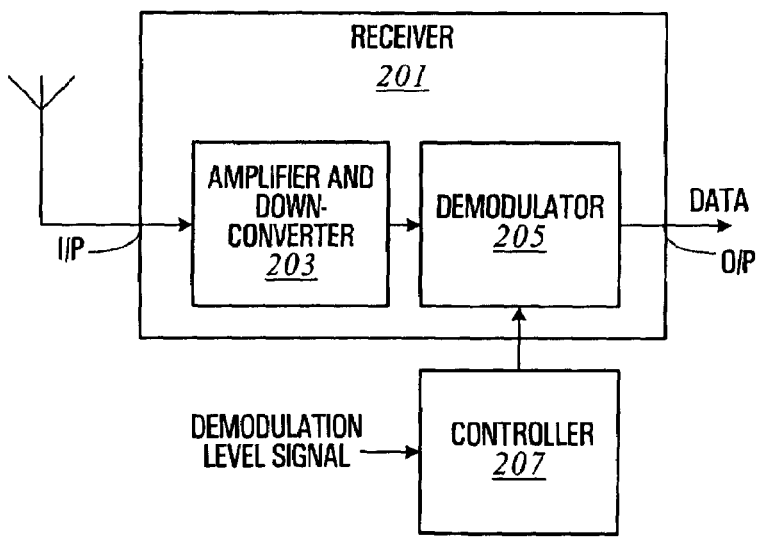
FIG. 4 shows a schematic diagram of a wireless receiver according to an embodiment of the present invention.

FIG. 4 shows a wireless receiver according to an embodiment of the present invention. The wireless receiver 201 comprises a power amplifier and down-converter 203, a demodulator 205 and a demodulator controller 207. In this embodiment, the demodulator is capable of varying the level of demodulation (i.e. the number of bits per baud) in order to match the modulation level of the received signal generated and transmitted by the transmitter. The demodulator 205 may include a number of different demodulation rates, for example QPSK, 16-QAM and 64-QAM. The level of demodulation is controlled by the demodulation controller 207. In order to control the level of demodulation to match the modulation rate of the transmitter, the transmitter may transmit a control message indicating the modulation rate used. This control message may be received by the controller 207 which responds by controlling the demodulation rate of the demodulator 205 to the corresponding level. The control signal may be transmitted by the transmitter as a separate signal from the data transmission signal i.e. out-of-band, or may be included as a message with the data (i.e. in-band), for example as a message header with the data packet. This latter in-band implementation may be particularly useful when the receiver is implemented, for example in a base station, which communicates with and receives data from a number of different sources (for example CPEs). With different sources transmitting at different modulation rates, embedding the modulation rate control signal with the data enables the controller to readily adapt the demodulation level to the particular data frame so that the correct demodulation scheme is used for each successive data packet, where each successive data packet may arrive from a different source within successive time frames according to a time division multiplexing access (TDMA) scheme.

The gain of the power amplifier 203 may be controlled in accordance with the power of the received signal and the gain may be adapted depending the strength on the received signal.

Figure 5:
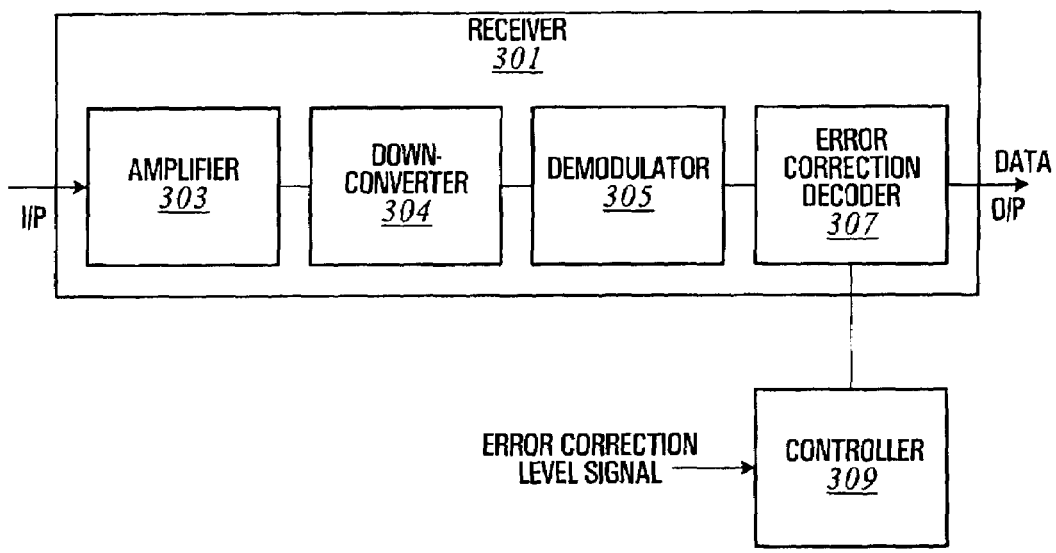
FIG. 5 shows a schematic diagram of a wireless receiver according to another embodiment of the present invention.

FIG. 5 shows another embodiment of a wireless receiver which is capable of adapting to different error coding rates used by the transmitter so that the appropriate decoding rate can be applied to the wireless signal. Referring to FIG. 5, the wireless receiver comprises a power amplifier 303, a down-converter 304, a demodulator 305, an error correction decoder 307 and a controller 309 for controlling the, decoder 307. In this embodiment, the demodulator may have a fixed demodulation level or may have a variable demodulation level as for the embodiment of FIG. 4.

In one implementation, the controller may be arranged to respond to a control signal generated and transmitted from the transmitter to control the level of error correction decoding to match the coding level applied by the transmitter. Again, the control message may be sent in-band, for example with each data packet, or separately from the data packets (i.e. out-of-band).

The wireless receivers described above with reference to FIGS. 4 and 5 allow the receivers to adapt to the different levels of channel capacity or data rate at which the transmitter operates so that the appropriate demodulation and/or error de-coding scheme may be applied at the receiver to recover the data correctly. The receiver according to embodiments of the present invention may be applied to any communication system and may for example be installed at a base station or at a customer premises.

Figure 6:
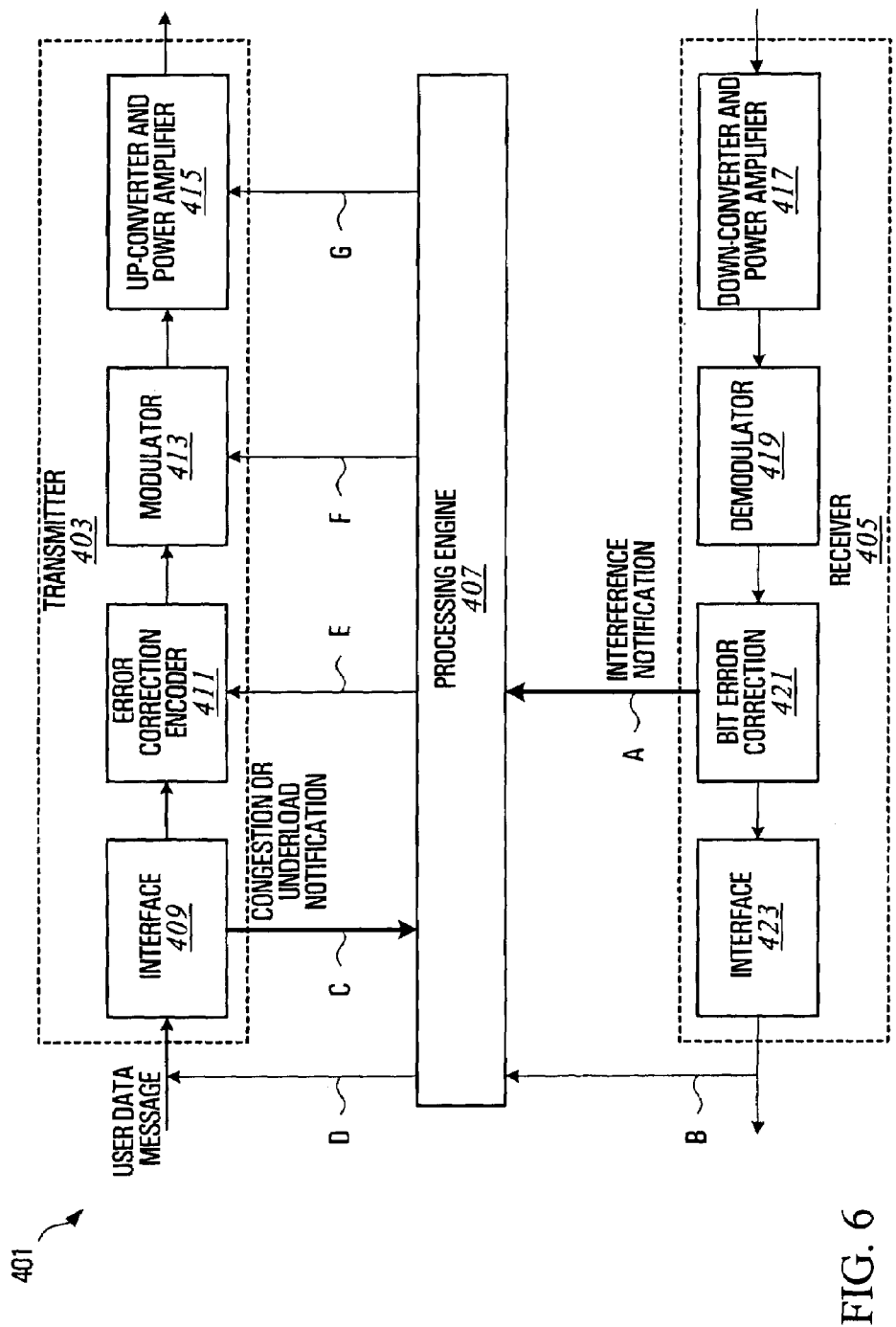
FIG. 6 shows a block diagram of a wireless transmitter and receiver according to an embodiment of the present invention.

FIG. 6 shows a communication apparatus in accordance with another embodiment of the present invention. Referring to FIG. 6, the apparatus 401 comprises a transmitter 403, a receiver 405 and a processing engine 407. The transmitter 403 comprises an interface 409, for example a Network Interface Card (NIC), for receiving data for wireless transmission and which may include an input buffer (not shown) for temporarily storing data to be transmitted, an encoder 411 for inserting code, for example forward error correction (FEC) code, into the data to be transmitted, a modulator 413 for generating signals corresponding to the data to be transmitted and which is capable of implementing a plurality of modulation schemes each having a different data rate (or number of bits per baud), and an up-converter and power amplifier section 415 for converting the signal from the modulator 413 to the desired carrier frequency for wireless transmission and for amplifying the RF signal to the required power level.

The receiver 405 includes a down-converter and power amplifier section 417 for receiving, amplifying and down-converting an RF signal, a demodulator 419 for demodulating the signal from the down-converter section 417, a bit error correction section 421 for processing the bit stream from the demodulator 419 to extract the transmitted data from the bit stream and to detect and correct errors in the received data, and an interface 423 for outputting the data, for example to end user equipment and/or onto a local area network (LAN).

The processing engine 407 receives information from the receiver 405 and controls functions of the transmitter 403.

The receiver 405 monitors interference of the received signal and if interference occurs, it sends an interference notification to the processing engine 407. In this particular embodiment, interference of the received signal is monitored by the error correction unit 421 which, for example measures the bit error rate (BER) of the incoming signal In one implementation, if the BER exceeds a predetermined threshold level, the error correction unit 421 sends an interference notification to the processing engine 407, as indicated by arrow A.

The receiver 405 is also arranged to pass instruction messages, which may be carried on the wireless signal from another transmitter, for example a base station (BTS), to the processing engine 407. The instruction message may be a power control instruction requesting the transmitter to change the power of the output signal either up or down, a message to vary the capacity or data rate of the wireless up-link or another message. In this embodiment, the control message for the transmitter is extracted from the data stream from the interface 423 and directed to the processing engine 407, as is indicated by arrow B.

The transmitter is adapted to monitor the quantity of data received for wireless transmission and to pass a message indicating the level of incoming traffic to the processing engine 407. In this embodiment, a monitor for monitoring the buffer level in the interface 409 is arranged to provide a message or notification to the processing engine 407 indicating congestion or the onset of congestion, and a message indicating an underloaded condition. A congestion notification may be forwarded to the processing engine 407 when the buffer level exceeds a predetermined threshold, and an underloaded notification may be forwarded to the processing engine when the buffer level is below a predetermined threshold, where the threshold levels for congestion and the underloaded condition may be the same or have different values (e.g. the underloaded threshold in below the congestion threshold). The congestion or underloaded notification messaging is indicated by arrow C.

The processing engine 407 uses one or more messages described above to control functions of the transmitter and/or to generate messages for wireless transmission to a receiver.

On receiving an interference notification from the error correction unit 421, the processing engine 407 is adapted to generate a message or report indicating that the receiver is suffering interference. In this embodiment, the interference report is passed from the processing engine 407 to the interface 409 as indicated by arrow D, for wireless transmission.

The processing engine is further adapted to provide a control signal to the error correction unit 411 to control error correction encoding, as indicated by arrow E, to provide a control signal for controlling the modulator 413, as indicated by arrow F, for example to control the modulation level, and to provide a control signal to the up-converter and power amplifier unit 415, as indicated by arrow G. to control the output power of the RF signal.

The processing engine 407 may also receive signals indicating the status of one or more components of the transmitter, for example the error correction code being applied, the level of modulation and the power level, and may further be adapted to forward messages indicative of the status of the transmitter over the wireless communication link. For example, this information may be applied from the processing engine 407 to the transmitter interface 409.

As mentioned above, the embodiment in FIG. 6 is capable of detecting interference of the received signal and to forward an indication of this interference over the wireless communication channel. Advantageously, this feature provides an interference notification to the receiver at the end of the communication link and this may be used to determine the cause of the interference, and may further be used to reduce the interference. For example, the receiver of the communication link may be a base station which communicates with a number of transceivers, for example located at a number of different customer premises. At a certain power level, a wireless transmission signal from one transceiver to the base station may cause interference with a wireless down-link between the base station and another transceiver. The base station may be adapted to identify the transmitter which is transmitting at that power level and causing interference and to request that transmitter to reduce its power level, thereby reducing or eliminating the interference.

The transmitter/receiver apparatus shown in FIG. 6 is also adapted to receive a control signal on the wireless down-link for controlling the power of the up-link signal. Advantageously, this feature allows the power of the output signal to be controlled remotely from the transmitting end of the down-link. Thus, for example where the receiving end of the up-link and transmitting end of the down-link terminate at a base station, the base station may issue a power control command or request to a CPE to change the power of the up-link signal. For example, in the scenario described above, if the power of the up-link signal from the CPE is causing interference with communication signals between the base station and another CPE, the base station may receive an interference notification from that other CPE and issue a control message to the CPE causing the interference to reduce the power of its up-link signal.

Therefore, advantageously the transmitter/receiver apparatus shown in FIG. 6 allows a base station to co-ordinate the power levels among various transmitters which communicate with the base station to avoid interference between different communication channels, while at the same time allowing the power level of a communication channel to be increased temporarily to facilitate an increase of the data carrying capacity of that channel to cope with an increase in data traffic. For example, if one channel is carrying a relatively low volume of traffic, that channel may reduce its data carrying capacity in which case its ability to tolerate some interference increases. This condition may allow another transmitter to increase its power level, for example to cope with a data surge, up to a power level that can be tolerated by the other channel.

The transmitter/receiver apparatus shown in FIG. 6 may also be adapted to respond to adverse conditions, such as adverse weather conditions affecting the transmission channel The apparatus may detect or be notified of the adverse conditions by any suitable means, including detecting an increase in the bit error rate of the received wireless signal or a message contained in the received wireless signal from the transmitting end of the down link notifying the apparatus of the adverse conditions. For example, such notification may be issued in response to the receiver at the up-link end of the transmission channel detecting an increase in bit error rate or a reduction in power level of the received signal. The processing engine may respond to the detection or notification of adverse conditions by increasing the gain of the amplifier 415 and/or decreasing the capacity of the transmission channel by reducing the modulation level and/or increasing the level of error code inserted into the data stream.

Figure 7:
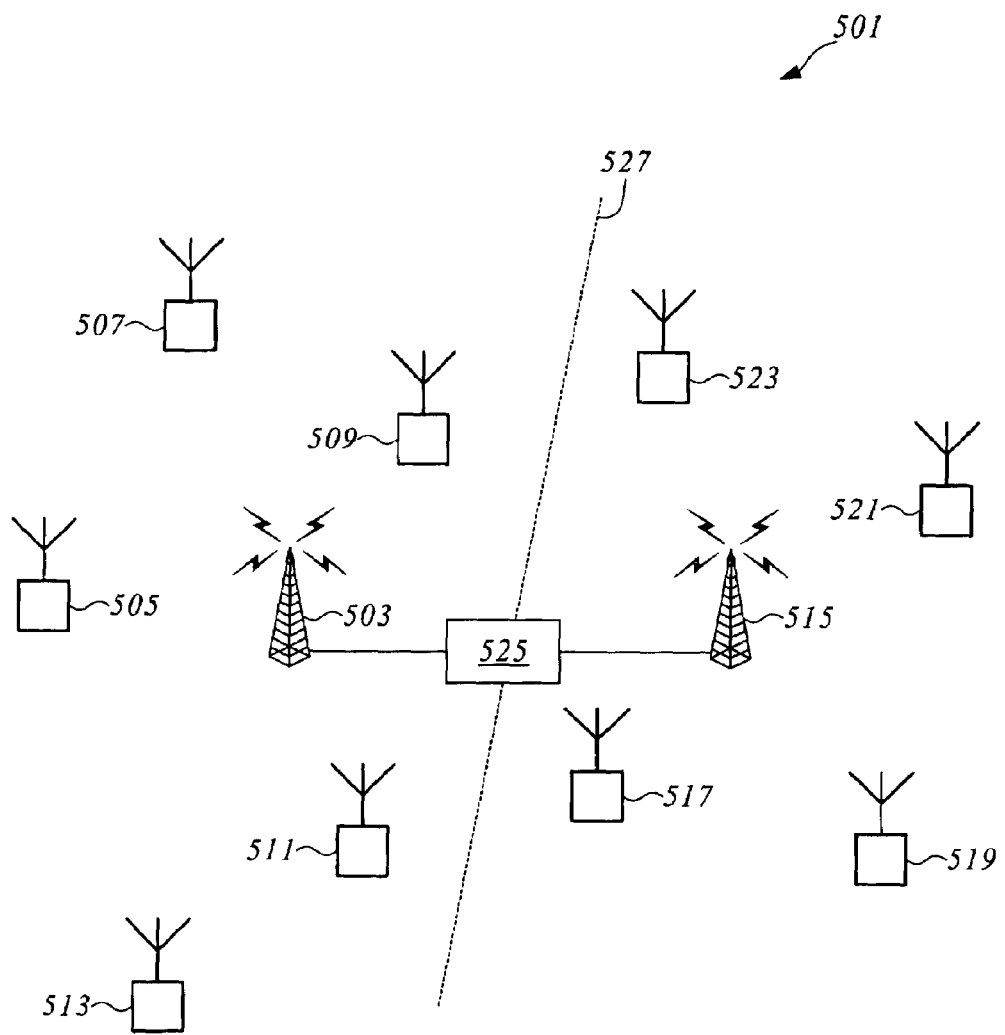
FIG. 7 shows an example of a wireless communication network according to an embodiment of the present invention.

FIG. 7 shows an example of a wireless communication network in accordance with an embodiment of the present invention. The communication network Sol includes a first base station 503 serving a plurality of wireless transceiver nodes 505, 507, 509, 511, 513, for example each located at a customer premises (CPE). The communication network 501 further includes a second base station 515 serving a plurality of transceiver nodes 517, 519, 521, 523, each of which may also be located at or near a customer premises (CPE). In this embodiment, each of the transceiver nodes are provided with a transmitter/receiver apparatus similar to that shown in FIG. 6. The communication network 501 further includes a server 525 connected to the first and second base stations 503, 515 for storing information for co-ordinating the operation of the transceivers within the network. The first and second base stations, 503, 515 communicate with their respective group of transceivers within their cell or sector (the boundary of which is indicated by the dashed line 527) over a bi-directional wireless communication link.

Examples of methods according to embodiments of the present invention for co-ordinating communication among the various transceivers and their respective base stations will now be described.

In one method, which may be referred to as passive on-line co-ordination, each customer premises equipment (CPE) radio receiver is equipped with an interference detector, for example as shown in the embodiment of FIG. 6. The interference detector may detect interference by measuring the bit error rate of the received signal. For example, a soft decoding may be used and interference may be determined from a condition whereby a maximum allowed number iterations has been reached, while the convergence criteria is still not met. If the interference exceeds a level that is acceptable (at a particular time), the CPE affected by the interference generates and forwards a message indicative of the interference (for example a "complaint") to the base station. In this embodiment, the server 525 stores information for each CPE identifying which other CPEs are in its vicinity. On receiving the complaint message, the base station sends a message to the co-ordination server 525 indicating that a complaint has been made and identifying the CPE raising the complaint. The coordination server 525 is arranged to check its information database to determine which CPE is in the vicinity of the CPE experiencing interference and forwards a message requesting the identified CPE or CPEs to lower its power if it is operating in a high power mode, i.e. at a power level above its basic or normal level. This control message or request may be transmitted to the offending CPE(s) from the server to the base station and from the base station to the identified CPE(s) over its respective wireless communication link.

In this embodiment, the information data base at the co-ordination server identifies the CPE or CPEs which interfere with a particular CPE based on modelling of the topology of the network, for example, which may include details of the distance between CPE's, their location with respect to the base station, their elevation and a description of obstacles such as vegetation which may absorb or reflect RF energy in the various communication paths. Thus, while this method advantageously involves a relatively small amount of network processing and is simple to implement, initial 3-D coverage modelling and pre-calculations to create the centralized data base for the whole network are required to deploy the method.

Another method of coordinating communication between various CPE's and their respective base station involves measuring real interference of a CPE communication channel by other CPE communication channels rather than precalculating interference based on 3-D topological modelling.

In one example, during initial network setup, each CPE radio intentionally increases the power of its transmission channel one at a time, and the other radios conduct interference measurements. The highest transmitting power achieved for each radio, without incurring a complaint from other radios is recorded for each radio in the server information data base. In one embodiment, the interference measurements may be restricted to radios served by a particular base station, and in another embodiment, interference measurements may be made for CPEs served by different base stations.

Preferably, this training procedure is repeated regularly to account for seasonal or other kinds of change. For example, new building or vegetations grow and fall, new CPEs are installed and existing CPEs are removed or otherwise become inactive. During the training phase, the group of radios which cause interference of a given radio is recorded in the data base for future reference. The power level at which each radio will cause interference and to which radio are recorded and organized in the server information data base so that information such as what radio will be interfered with by which radio at what level is immediately available upon request.

In another method of co-ordinating the operation of various CPEs according to another embodiment of the present invention, a CPE monitors congestion or the onset of congestion and if congestion is detected, the CPE increases the power of the RP signal from the transmitter without first seeking permission from the base station. In one embodiment, the CPE may increase its power to a particular level which may be a small or minimum step or a step which enables the CPE to increase the capacity or data rate of the wireless transmission channel. The CPE maintains the power of the transmission signal at that level and listens or waits for a complaint from the base station. If no complaint is received by the CPE, the CPE may increase the power of the transmission signal further, for example by a minimum step or increment. Again, the CPE maintains the power at that new level and listens or waits for a complaint from the base station. This process may be repeated either until a complaint is received or until the required power level is reached. If the CPE receives a complaint, the CPE reduces the power to a lower level, for example to the power level immediately preceding that at which the complaint was received. If, having reduced the power level, a further complaint is received, the CPE may be arranged to reduce the power level further, preferably incrementally. In implementing this method, preferably the coordinating server is arranged to respond to any complaint as fast as possible. For example a signal requesting the CPE that is causing the interference to reduce its power may be passed to the CPE through the base station from the server as a relatively high priority control message.

The above described methods of coordinating CPE operation in which the operation is controlled in response to actual interference between communication channels requires more network layer processing than is involved in the first described method but advantageously may allow a net increase in data flow between CPEs and their base station.

In another method of coordinating the operation of CPEs, a simulation is conducted based on terrain information. The highest achievable power for each CPE is determined from this information and stored in a respective base station or in the CPE itself for use at a time when a CPE is experiencing congestion. Advantageously, this embodiment does not require a data base containing information for the network, there is no need for a server and no need to exchange information for neighbouring base stations. The co-ordination of the operation of the CPE's simply relies on the pre-calculated maximum power for each CPE. This method may be attractive when the terrain environment is simple and/or where the network infrastructure, for example the available processing power and internal communication bandwidth is still relatively thin.

As mentioned above in connection with the embodiments shown in FIG. 6, each CPE is equipped with a queue-level or packet rate monitor which monitors congestion. Once the meter exceeds a pre-set threshold a message indicating congestion may be sent to the base station and, the base station is preferably arranged to permit the CPE to increase its power to the level that no other CPE complains within the network. A message indicating permission to increase the power level may be transmitted to the CPE experiencing congestion from the base station over the down-link, and on receiving this signal, the CPE may increase its transmission power.

In determining whether a congestion condition exists a congestion condition may be determined only if the buffer level exceeds or reaches a threshold a predetermined number of times. This may be implemented by using a simple "k-out-of-n" rule so that a congestion condition is only determined when the threshold level is reached or exceeded k-out-of-n times. Advantageously, this arrangement desensitizes the congestion detector and assists in avoiding a false indication of a congestion condition. Advantageously, the sensitivity may be adjusted by changing the value of "k" or "n" or the threshold level itself or any combination of these.

In another embodiment, a transmitter may be arranged to reduce power during periods of low data flow. Advantageously, this allows the power drawn by the power amplifier to be reduced and decreases the amount of radiated power which may potentially interfere with other spectral bands or the receiver equipment. In this low power mode, (e.g. idle mode), during periods of low data flow, a low power level may be detected at the receiver end of the communication link or the fact that a transmitter is operating in a low power mode may be otherwise communicated to the receiver end of the communication link (e.g. a base station), for example by means of a low power mode message. This message may be communicated to a co-ordination server (if there is one) and the co-ordination server may be arranged to inform other transmitters of the potential for additional data throughput at this time. Alternatively, the base station receiving the low power mode indication from a transmitter may itself be arranged to inform other transmitters of the potential for additional throughput.

Figure 8:
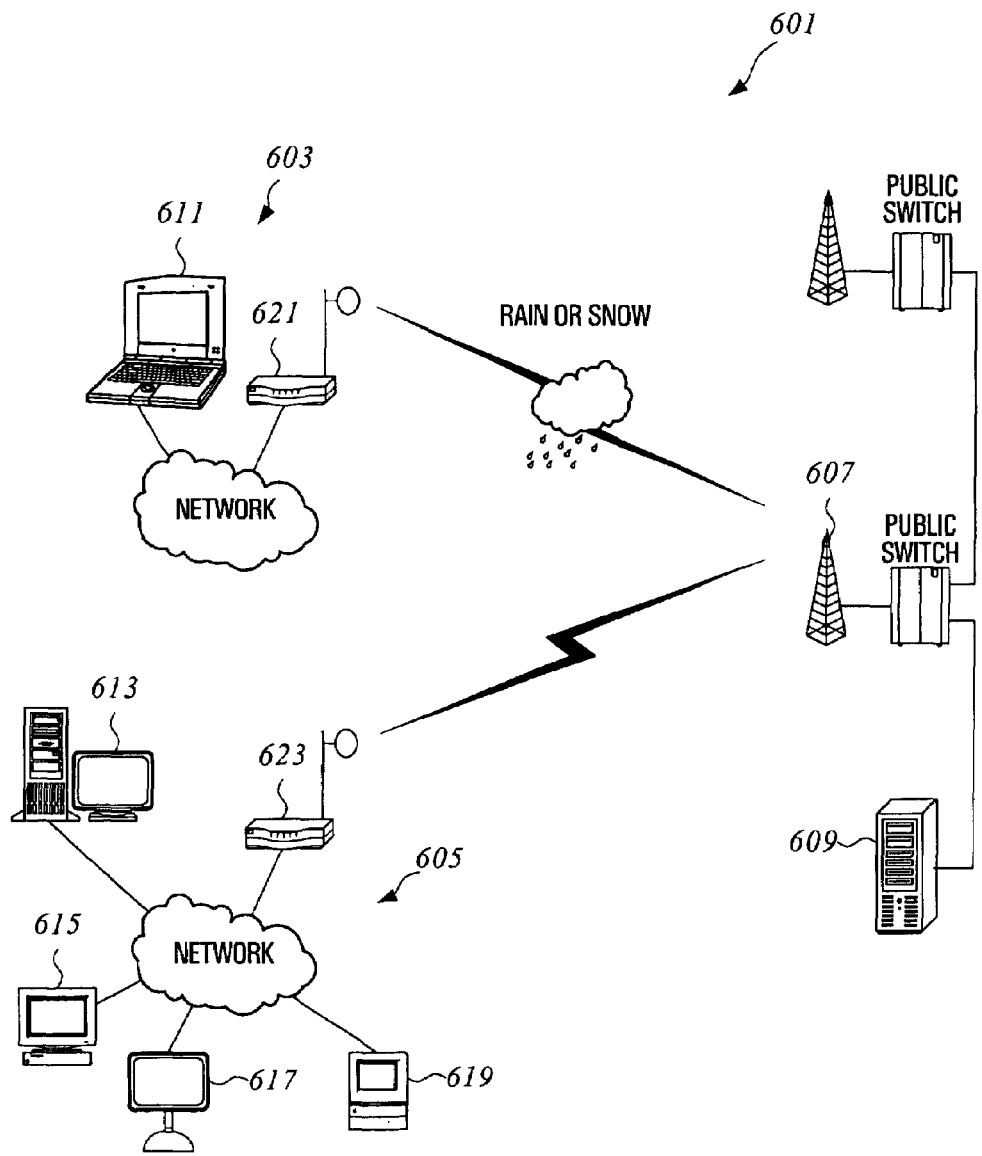
FIG. 8 shows an example of a wireless communication system according to an embodiment of the present invention.

FIG. 8 shows an example of a wireless communication network according to another embodiment of the present invention. Referring to FIG. 8, the network exemplifies a point-to-multi-point network and includes a plurality of CPE's including a first CPE 603 and a second CPE 605, and a base station (BTS) 607. In this embodiment, the base station 607 is connected to a public switched network, and the network further includes a co-ordination server 609 for coordinating the operation of the CPE's within the cell or sector served by the base station 607, and optionally may co-ordinate the operation of CPE's served by one or more other base stations. In this example, the first CPE 603 is a small office home office (SOHO) and the second CPE is a small or medium enterprise (SME) In other embodiments the CPEs may be of any other type, without limitation. In one embodiment, the BTS may be connected to the public switched network by optical fiber and the co-ordination server 609 may be located in a network management center. Each CPE includes one or more data processors 611, 613, 615, 617, 619 and a router 621, 623 for transmitting data from the data processor(s) over its respective wireless communication link to the base station 607. Each router may include a transmitter similar to that described above, for example a transmitter shown in any one of FIGS. 1 to 3 and 6. The data processors may communicate with the router through any suitable communication system, for example through an Ethernet link or network.

In this example, the communication channel between the first CPE 603 and the base station 607 is experiencing adverse transmission conditions caused for example by adverse weather such as rain, sleet, hail or snow. In order to maintain the communication link, the CPE transmitter increases the power of the RF signal to compensate for attenuation of the up-link signal caused by the adverse weather conditions. The second CPE 605 is experiencing heavy traffic flow such that a congestion condition is determined. In this case, the transmitter of the second CPE 605 increases the capacity or data flow rate of its up-link channel to the base station 607 and also increases its power to facilitate transmission at the higher data flow rate. The increase in capacity and power of the transmitter may be controlled in accordance with any of the control methods described above, as well as other control methods.

Figure 9:
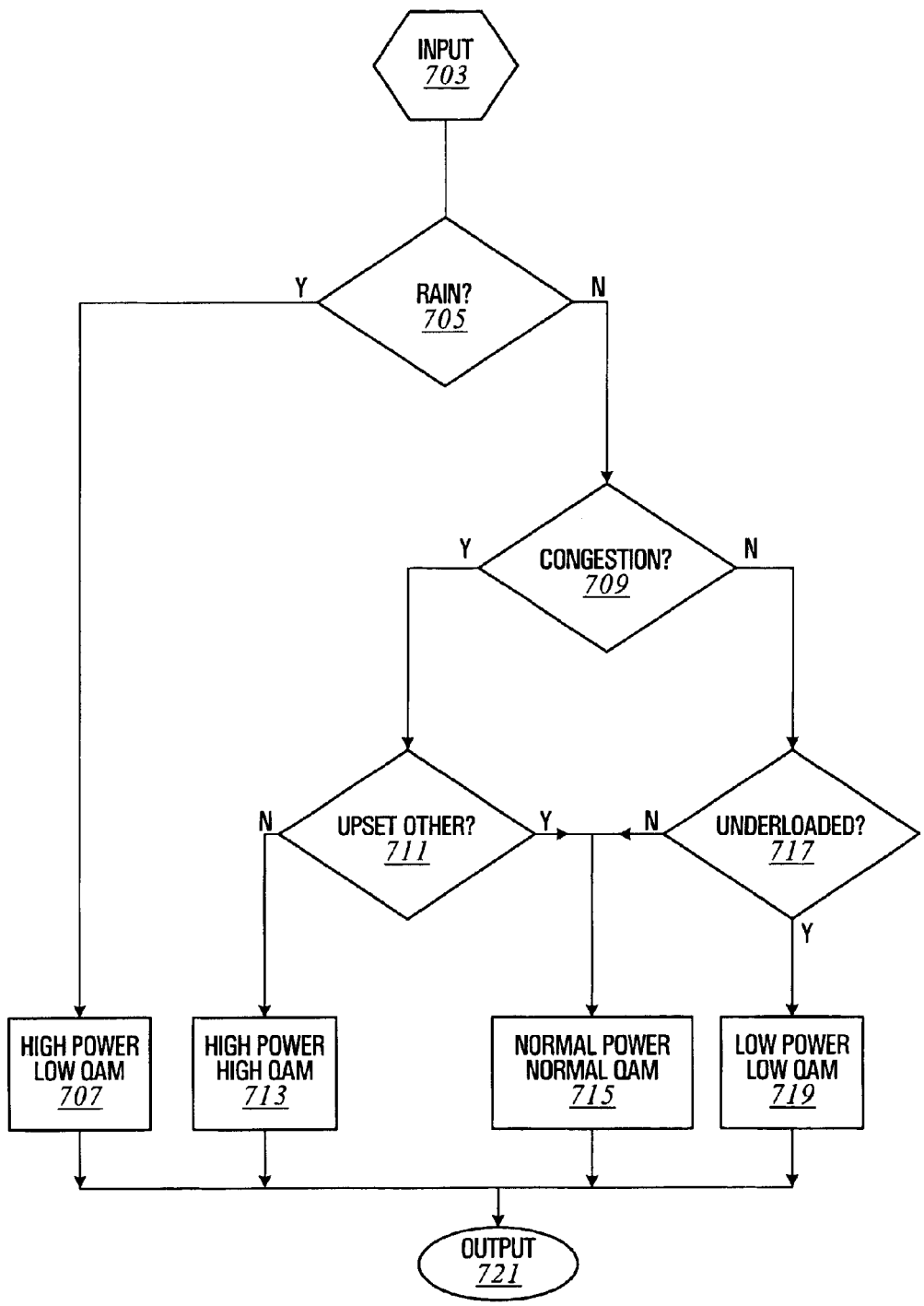
FIG. 9 shows a flow diagram of a transmitter control method according to an embodiment of the present invention.

FIG. 9 shows an example of a flow diagram, for example describing an algorithm, which may be used in controlling the operation of a transmitter. The algorithm may, for example, be implemented in the processing engine of the embodiment of FIG. 6. In the first step 703 the processor receives certain data associated with the wireless communication channel on the basis of which the transmitter is controlled. The second step 705 determines whether adverse conditions, caused for example by rain are affecting the transmission channel and if this is the case, the algorithm passes to step 707 which causes the power of the transmission signal to be increased and the capacity of the transmission channel or the data rate to be decreased. As mentioned above, the capacity of the communication channel can be reduced by reducing the modulation rate (i.e. bits per baud) and/or by increasing the level of error correction code inserted into the data. The presence of rain or other adverse conditions may be detected by any suitable means, for example by an increased bit error rate in the up-link or down-link or by a reduction in power at the receiver of the up-link or down-link.

If no adverse conditions are detected, the algorithm passes to step 709 which determines whether the flow of incoming data to the transmitter is causing a congestion condition. If congestion is detected, the algorithm passes to 711 which determines whether the up-link channel is upsetting another communication channel, for example by interference. If the up-link channel is not upsetting another communication channel, the algorithm passes to step 713 which specifies both a high level of output power and a high data carrying capacity for the transmission channel. However, if at step 711 it is determined that the transmission channel is upsetting another communication channel, the algorithm passes to step 715 which specifies a normal power level and normal data carrying capacity for the transmission channel.

If at step 709, it is determined that there is no congestion, the algorithm passes to step 717 which determines whether the incoming data flow is such that the transmitter is underloaded. If the answer is "No", the algorithm passes to step 715 which specifies both normal output power and normal data carrying capacity for the wireless transmission channel. On the other hand, if at step 717, an underloaded condition is determined, the algorithm passes to step 719 which specifies both low output power and low data carrying capacity for the wireless communication channel. Appropriate control signals for controlling the operation of the transmitter are output at step 721.

It is to be noted that in the embodiment described above, appropriate control of the transmitter in response to adverse conditions, such as weather conditions take priority over control in response to congestion. In this embodiment, in the event of adverse conditions, the congestion algorithm is not exercised. Although the algorithm described above may be implemented with three different levels of output power and data carrying capacity (e.g. modulation level), other embodiments may be implemented using more or fewer levels of power and/or levels of data carrying capacity.

Figure 10:
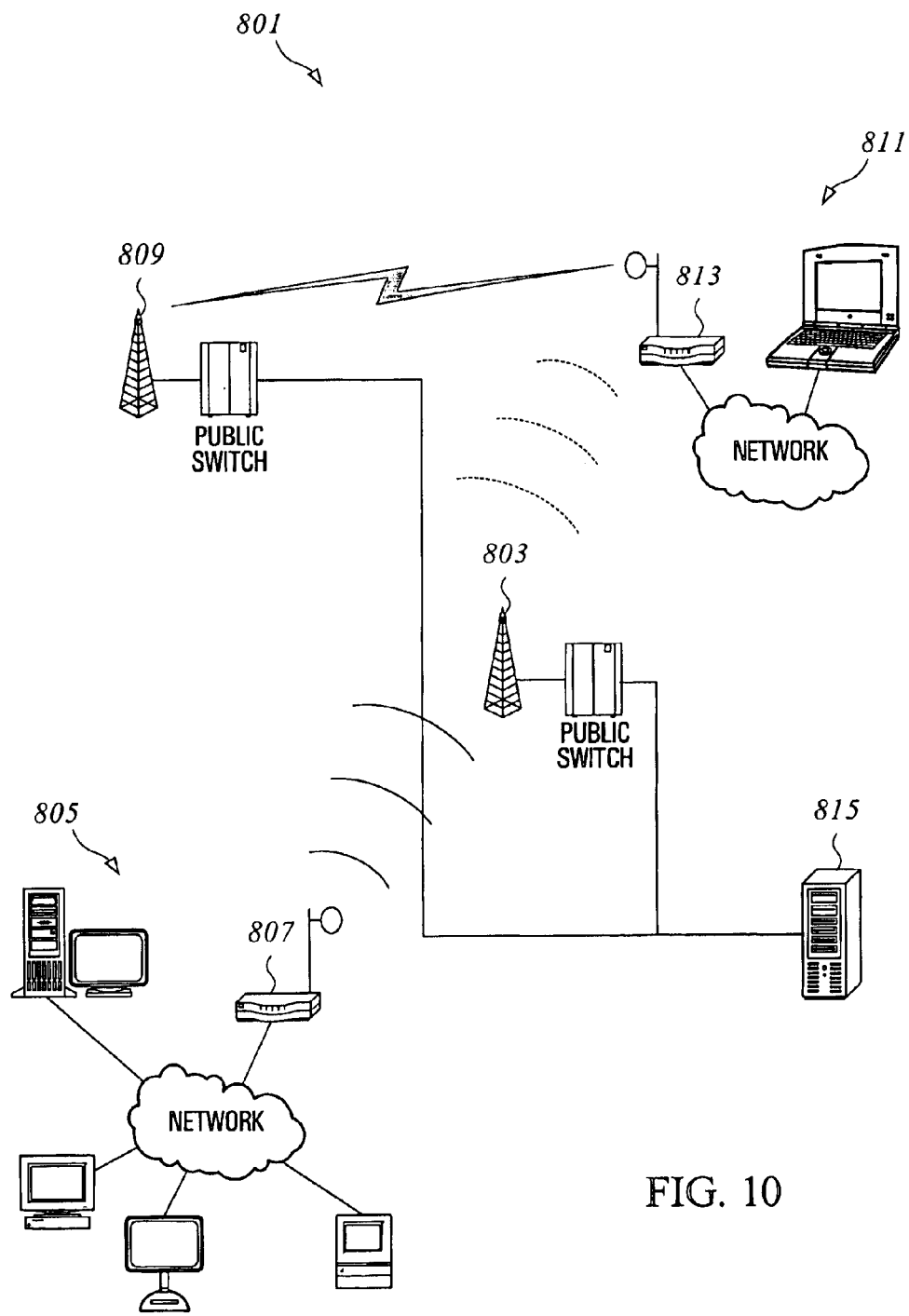
FIG. 10 shows an example of a wireless communication network according to another embodiment of the present invention.

An example of a method of controlling the operation of a transmitter in response to real time or "on-the-fly" interference measurements will now be described with reference to FIG. 10. Referring to FIG. 10, a wireless communication network 801 includes a first base station (BTS) 803 and a first CPE 805 which includes a wireless transceiver 807 for sending and receiving data to and from the base station over a bi-directional wireless communication link. The communication network further includes a second base station 809 and a second CPE 811 which has a wireless transceiver 813 for communicating with the second base station 809 over a wireless communication channel. The respective first and second base stations and CPE's may be located in neighbouring sectors or cells. The first and second base stations 803, 809 are connected to a public switched network, for example by optical fiber, cable or twisted pairs. In this embodiment, a co-ordination server 815 is provided to co-ordinate the operation of the transmitters 807, 813 of both CPEs 805, 811. The transceivers 807, 811 of each CPE may be similar to that described above and shown in FIG. 6.

An example of the operation of the communication network shown in FIG. 10 will now be described also with reference to FIG. 6. If a congestion condition is declared in the interface 409 of the transmitter 403, the control or processing engine 407 will increase the power of the wireless transmission signal and may at the same time increase the data carrying capacity of the channel, for example by increasing the modulation level of the modulator 413. The transmitter may also generate and transmit a message indicative of the congestion condition to the base station 803 and the base station passes the message to the server 815. The increased power level may or may not be sufficient to cause interference with the communication channel between the second CPE 811 and the second base station 809. For example, the new power level may be insufficient to cause interference if the second CPE 811 either has no data to send or is in a low data carrying capacity mode (e.g. operating at a low modulation level, for example QPSK mode) In this case, the communication channel may not be affected by on-channel or co-channel interference (CI). If no interference is detected, the first CPE 805 may increase its power and possibly data carrying capacity further. Before increasing the power level further, the first CPE 805 pauses for a short period of time to allow the second CPE 811 to conduct an interference measurement and issue a complaint or interference notification, if necessary.

If the first CPE 805 continues to increase the transmission power level, eventually the power level may be sufficient to cause interference, in which case an interference notification will be passed to the processing engine 407 of the transceiver 813 of the second CPE 811. The second CPE transmits an interference notification to its base station 809 which passes the notification to the co-ordination server 815. The co-ordination server identifies the first CPE 805 as the cause of the interference through information concerning congestion and/or power level received from the first CPE and issues a command or request for the transmitter 807 to reduce its power level. This request or command may be transmitted via the first base station 803 over the wireless down-link channel. On receiving the control message, the processing engine 407 of the first transceiver 807 reduces the output power level of the wireless transmission channel by a predetermined amount. If despite the reduction in power level, interference is still detected at the second CPE 811, an interference notification may again be sent to the co-ordination server 815 and the power level reduced again, and this process may be repeated until interference no longer occurs. The transmitter of the first CPE 805 continues to transmit data at a higher rate over the higher power, higher capacity channel. When the congestion is over, as may be indicated by monitoring the buffer level of the interface 409 or the incoming data rate, the processing engine is adapted to reduce the power level and possibly also the data carrying capacity of the channel, as necessary, so that another CPE has the opportunity to use its capability of increasing power and data rate to alleviate its own potential congestion.

Embodiments of the present invention may be implemented in any communication architecture, including point to multi-point, as described above, point-to-point and mesh networks. Furthermore, embodiments of the present invention may be implemented using any suitable access scheme, including time division multiplexing access (TDMA) and frequency division multiplexing access (FDMA).

Although embodiments of the transmitter have been described as being implemented in customer premises equipment, other embodiments of the transmitter may be implemented in other equipment, for example in base stations, and embodiments of methods for coordinating operation of the transmitter may be used to co-ordinate operation between base stations. The principles of the present invention may be applied to satellite systems for example to co-ordinate communication from different satellites, or to co-ordinate communication between a satellite system and a terrestrial wireless system. An example of this latter implementation will now be described with reference to FIG. 11.

Figure 11:
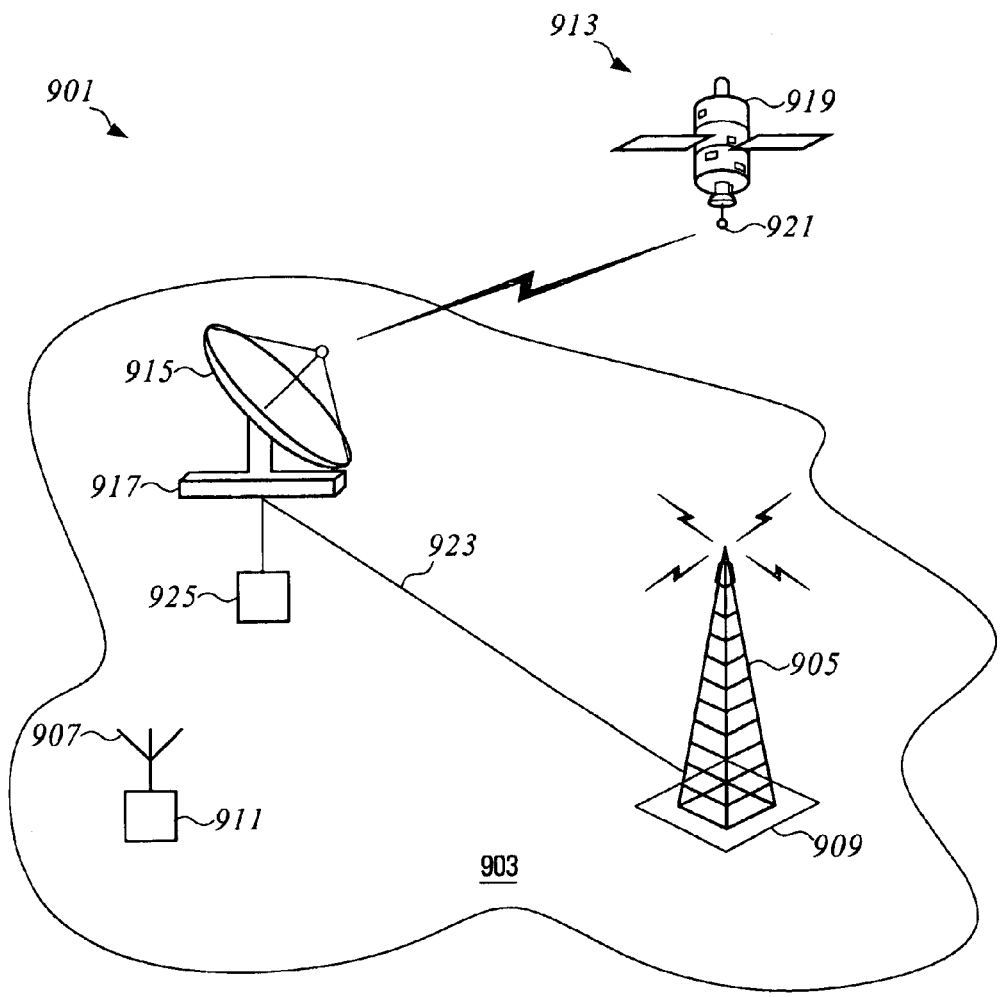
FIG. 11 shows an example of a wireless communication system according to another embodiment of the present invention.

Referring to FIG. 11, a communication system 901 comprises a terrestrial communication system 903 including first and second transmitters/receivers 905, 907. In this embodiment, the first transmitter/receiver is located at a base station 909 and the second transmitter/receiver is located at a customer premises 911.

The communication system further comprises a satellite system 913 which includes an earth based base station 915 which includes a transmitter and receiver 917 and a satellite 919, which for example may be a low earth orbit (LEO) satellite, which also includes a transmitter and receiver 921.

Both the terrestrial based communication system and the satellite system 903, 913 may operate at micro-wave frequencies, and depending on the transmission power of the two systems, there may be potential for interference. To avoid interference, during the period the satellite 919 is passing over the area containing the terrestrial based communication system 903, the satellite 919 and/or the satellite base station 915 may be controlled to cease communication in order to avoid interference with the terrestrial communication system 903, if the terrestrial communication system has priority over the satellite communication system. Alternatively, if the satellite communication system has priority over the terrestrial based communication system, when the satellite system passes over the region containing the terrestrial a communication system 903, the terrestrial based system may be controlled to cease communication in order to prevent interference with the satellite communication system.

In one implementation, an indication of the presence of the satellite over the terrestrial based communication system may be transmitted from the satellite base station 915 to the base station 909, for example through a communication link 923. In response to this notification, the base station transmitter and/or the CPE transmitter may cease communication.

Alternatively, the transmission power of the two systems may be co-ordinated, for example depending on the traffic flow through each communication link so that neither the terrestrial based communication system or the satellite communication system need cease communication when the satellite 919 is overhead. For example, if either one or both of the transmitters of the terrestrial based communication system 903 are transmitting at a low data rate, the satellite system 913 may continue to communicate with its base station without causing interference.

Appropriate messaging between the terrestrial system and the satellite may be used to control the power of the satellite system 913 to avoid interference, or to prevent interference while obtaining a maximum data rate. Conversely, if the terrestrial based system is transmitting at a high data rate as the satellite passes overhead, the satellite system may be controlled by appropriate messaging between the terrestrial based system and the satellite system to reduce its power to prevent interference with the terrestrial communication system.

At the same time, the capacity or data rate of the satellite channel may be reduced to facilitate reception of the lower power satellite channel.

Similarly, if the satellite 919 transmits at a low data rate as it traverses the region containing the terrestrial based communication system 903, the terrestrial communication system may continue communication without causing interference of the satellite channel. On the other hand, if the satellite system is transmitting at a high data rate, the terrestrial based communication system 903 may be controlled to reduce its power to prevent interference with the satellite system. At the same time, the capacity or data rate of one or both of the terrestrial based communication channels may be reduced to facilitate reception of the reduced power channel(s).

In embodiments of the system of FIG. 11, any one or more of the transmitters of the terrestrial communication system and the satellite communication system may be similar and have similar functions to the embodiments described above, for example as shown in FIGS. 1, 2, 3 and 6. For example, the transmitter may be capable of controlling the power of the output signal and also the capacity or data rate of the channel, for example by controlling the modulation or encoding level, for example to compensate for signal attenuation caused by adverse conditions and to handle a congestion condition. Co-ordination between the terrestrial communication system and the satellite may be implemented by a server 925 which may include an information data base which receives and stores information concerning operating conditions of the terrestrial and satellite communication systems, makes decisions based on the received information and issues control signals for controlling the systems.

The transmitter, receiver, control system and method of communication control according to embodiments of the present invention may be implemented in any wireless communication system, including fixed transmitter and receiver systems, and broad band wireless systems for example operating at micro-wave frequencies at or above about 2 GHz.

Other embodiments of the present invention may include any feature described herein in combination with any other feature.

Modifications and changes to the embodiments described herein will be apparent to those skilled in the art.

The invention claimed is:

1. A fixed-position wireless transmitter for generating a signal for wireless transmission comprising signal generating means for receiving data and generating a signal containing received data for wireless transmission at a frequency at or above 2 GHz which causes said wireless signal to be attenuated by atmospheric precipitation, monitoring means for monitoring the quantity of data supplied to said signal generating means for wireless transmission, and control means for controlling the power of the generated wireless signal within a range reserved to compensate for attenuation by atmospheric precipitation in response to said monitored quantity of data for wireless transmission.

2. A fixed-position wireless transmitter as claimed in claim 1, further comprising request generating means for generating a request to increase the power of said wireless signal, receiving means for receiving a signal indicating whether permission to increase the power is granted or denied, and wherein said control means is adapted to control said power in response to the received signal.

3. A fixed-position wireless transmitter as claimed in claim 1, further comprising notification generating means for generating a signal based on the power of said wireless signal and means for transmitting the notification signal.

4. A fixed-position wireless transmitter as claimed in claim 1, further comprising comparing means for comparing a parameter indicative of the monitored quantity of data for wireless transmission with a predetermined threshold value, and wherein said controller is arranged to control said signal generating means to decrease said power in response to said parameter decreasing from a value at or above said predetermined threshold to a value below said predetermined threshold.

5. A fixed-position wireless transmitter as claimed in claim 1, further comprising memory means storing a parameter indicative of the maximum output power level for the wireless transmission signal that does not interfere with another wireless signal.

6. An apparatus for generating a signal for wireless transmission, comprising signal generating means for receiving data and generating an output signal containing received data for wireless transmission, monitoring means for monitoring the quantity of data supplied to said generating means for wireless transmission and a controller for controlling said signal generating means to vary the rate at which data is output from said signal generating means in said output signal in response to said monitored quantity of data for wireless transmission, wherein said signal generating means includes signal encoding means for inserting code into said data, and said controller is arranged to control the quantity of code inserted into said data in response to said monitored quantity of data for wireless transmission.

7. An apparatus as claimed in claim 6, wherein said code provides an error check.

8. An apparatus as claimed in claim 7, wherein said code comprises a forward error correction code (FEC).

9. An apparatus as claimed in claim 6, wherein said signal generating means includes signal modulating means capable of modulating said signal with data at at least two different data rates, and said controller is arranged to control said modulating means to modulate said signal at a data rate determined according to the monitored quantity of data for wireless transmission.

10. An apparatus as claimed in claim 6, wherein said signal generating means further includes a signal amplifier for amplifying said signal, and said controller is arranged to control the gain and/or power output of said amplifier in response to said monitored quantity of data for wireless transmission.

11. An apparatus as claimed in claim 6, further comprising comparing means for comparing a parameter indicative of the monitored quantity of data for wireless transmission with a predetermined threshold value and wherein said controller is arranged to control said generating means to decrease the data transmission rate in response to said parameter decreasing from a value at or above said predetermined threshold to a value below said predetermined threshold.

12. An apparatus as claimed in claim 11, wherein said controller is arranged to control said modulating means to reduce the modulation rate in response to said parameter falling below said predetermined threshold value.

13. An apparatus as claimed in claim 6, further comprising comparing means for comparing a parameter indicative of the monitored quantity of data for RF transmission with a threshold value and for communicating the result of said comparison to said controller.

14. An apparatus as claimed in claim 13, wherein said controller is arranged to control said generating means to increase the rate of data transmission if said parameter exceeds said threshold value.

15. An apparatus as claimed in claim 14, further including delay means for delaying the response of said controller to said parameter passing above or below said predetermined threshold.

16. An apparatus as claimed in claim 15, wherein said delay means comprises counter means for counting the number of times said parameter passes said predetermined threshold, said controller being arranged not to respond to control said generating means until said number reaches a predetermined value.

17. An apparatus as claimed in claim 13, further comprising request generating means for generating a request to a control station to increase the data transmission rate in response to said monitored quantity of data for wireless transmission, receiving means for receiving a signal indicating whether permission to increase the data transmission rate is granted or denied, wherein said controller controls said generating means in response to the received signal.

18. An apparatus as claimed in claim 13, further comprising request generating means for generating a request to a control station to increase the gain of said amplifier and receiving means for receiving a signal from said control station indicating whether permission to increase said gain is granted or denied, said controller being arranged to control said generating means in response to said received signal.

19. An apparatus as claimed in claim 13, further comprising memory means for storing a parameter indicative of the maximum output power level of the wireless data transmission signal which does not interfere with other wireless transmission signals.

20. A communication system comprising a first fixed-position wireless transmitter and a second fixed-position wireless transmitter, the first transmitter having means to vary the power level of the wireless transmission signal transmitted by said first transmitter, said second transmitter comprising signal generating means for generating a signal for wireless transmission containing data and means to vary the rate at which data is placed onto said signal, communication means for communicating from said first transmitter to said second transmitter a signal indicative of the wireless signal power level from said first transmitter, said second transmitter including means for increasing the data transmission rate output by said second transmitter when the power level of said first transmitter communicated by said communicating means is at a predetermined value.

21. A fixed-position wireless transmitter as claimed in claim 1, further comprising receiving means for receiving a signal identifying the fixed-position wireless transmitter and indicating that the wireless signal transmitted thereby is causing interference, and wherein said control means is adapted to reduce said power in response to the received signal.

22. A fixed-position wireless transmitter as claimed in claim 1, wherein said control means is operable to increase said power without requesting permission.

23. A fixed-position wireless transmitter as claimed in claim 1, wherein said controller is responsive to the quantity of data falling below a threshold level to reduce the power of said wireless signal to a value below a normal value reserved for said transmitter.

24. A fixed-position wireless transmitter as claimed in claim 23, further comprising a controller for controlling the data carrying capacity of the wireless signal, and operative to reduce said capacity in response to the quantity of data falling below said predetermined threshold.

* * * * *